US005188500A

United States Patent [19]

Eide et al.

[11] Patent Number: 5,188,500

[45] Date of Patent: Feb. 23, 1993

[54] DEVICE FOR TEARING REFUSE BAGS

[75] Inventors: Russel L. Eide, Columbia Heights, Minn.; Eric P. Eide; Russel L. Eide, II, both of Mondovi, Wis.

[73] Assignee: Light Work Inc., New Underwood, S. Dak.

[21] Appl. No.: 717,475

[22] Filed: Jun. 18, 1991

[51] Int. Cl.$^5$ .............. B65G 65/04

[52] U.S. Cl. .............. 414/412; 241/193; 241/195

[58] Field of Search .............. 414/412, 324; 241/193, 241/195

[56] References Cited

U.S. PATENT DOCUMENTS

| | | | |
|---|---|---|---|
| 1,916,531 | 7/1933 | Robb | 414/412 |
| 3,356,016 | 12/1967 | Eidal | 241/193 X |
| 3,650,484 | 3/1972 | Kimble et al. | 241/195 X |
| 4,572,258 | 2/1986 | Mischel | 241/193 X |
| 4,798,508 | 1/1989 | Lewis | 414/412 |
| 4,875,630 | 10/1989 | Carlson | 241/193 X |
| 4,960,247 | 10/1990 | Lundell | 241/193 X |
| 5,005,980 | 4/1991 | Zimmerman | 241/193 X |

FOREIGN PATENT DOCUMENTS

| | | | |
|---|---|---|---|
| 696751 | 8/1940 | Fed. Rep. of Germany | 241/193 |
| 60046 | 10/1947 | Netherlands | 241/195 |
| 106404 | 1/1943 | Sweden | 241/195 |
| 1244033 | 7/1986 | U.S.S.R. | 414/412 |

*Primary Examiner*—David A. Bucci
*Attorney, Agent, or Firm*—Peterson, Wicks, Nemer & Kamrath

[57] ABSTRACT

A device (10) for continuously tearing bags containing material such as refuse is disclosed including elongated, flexible flails (14) secured to a rotatable rotor (12). The flails (14) are formed in the preferred form from steel wire rope cables (28) having their free ends captured within thick wall tubing (34) swedged thereon. In addition to keeping the ends from fraying, the tubing (34) acts as a centrifugal weight and hammer for the cable (28). The rotor (12) is formed of L-shaped plates (16) attached together to extend quadrantly from and form a square tubular beam surrounding the axis of rotor (12). The flails (14) extend through apertures (36) formed in the leg portions of the plates (16) defining the square tubular beam and are secured to the leg (18) of the plates (16) spaced from the square tubular beam by cable clamps (38) having U-shaped bolts (40) extending through apertures (50) formed in the legs (18). The second legs (22) of the L-shaped plates (16) extend generally parallel to the U-shaped bolts (40) and protect the cable clamps (38). As the bags delivered by a conveyor (58) to the device (10) fall under gravitational forces from the end thereof, the falling bags are struck in the same direction by the flails (14) which are rotated in vertical rotational planes to tear the bags and release the contents thereof.

20 Claims, 2 Drawing Sheets

DEVICE FOR TEARING REFUSE BAGS

BACKGROUND

The present invention generally relates to devices for continuously tearing bags to release the contents thereof and particularly to devices for tearing refuse bags and releasing the refuse therefrom.

One method that refuse is collected for disposal especially from households is with the refuse contained in bags of a plastic, paper, or like construction. After collection, refuse is often further processed before its disposal. For example, refuse is often sorted to remove certain materials such as ferrous material, recycleables, tires or the like, with sorting being performed manually or mechanically. Thus, it is necessary to remove the refuse from the bag to allow such sorting. Likewise, complete bags of refuse may be difficult or impractical to handle during further processing. For example, the capabilities of garbage grinding mills may not allow receipt of unopened bags of refuse. Further, it may be desirable to expose the refuse and/or remove the bags from the refuse. For example, to allow composting, the refuse must be exposed to air and/or it may be undesirable to allow bags which often are not formed from readily decomposable material to be mixed in with the refuse to be composted. Thus, a need has arisen for devices which are able to continuously tear bags of refuse.

SUMMARY

The present invention solves this need and other problems in the field of refuse processing by providing, in a first aspect of the present invention, a plurality of elongated, flexible flails which are rotated about an axis generally perpendicular to the flails and which strike the bags of refuse as the refuse falls under gravitational forces.

In a further aspect of the present invention, it is an object of the present invention to provide flails formed of steel wire rope cables of a relatively large diameter which bat the refuse.

In another aspect of the present invention, it is an object of the present invention to provide a securement method for diametric flails which cannot be bent in an arcuate manner with a relatively small diameter.

In a still further aspect of the present invention, it is an object of the present invention to provide a rotor which protects against refuse wrapping around the rotor itself and which protects the securement of the flails to the rotor.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
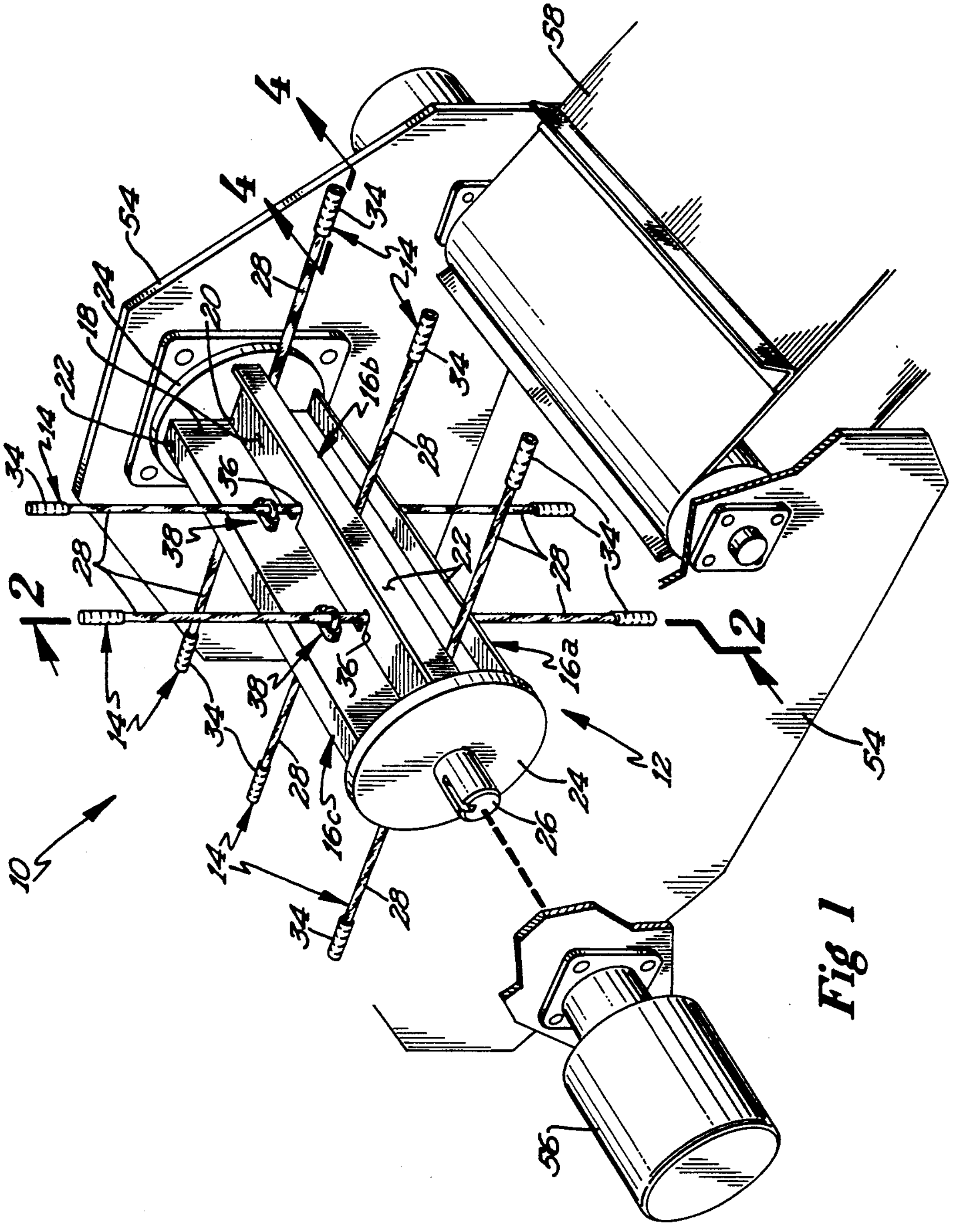
FIG. 1 shows an exploded, perspective view of a bag tearing device according to the preferred teachings of the present invention.
Figure 2:
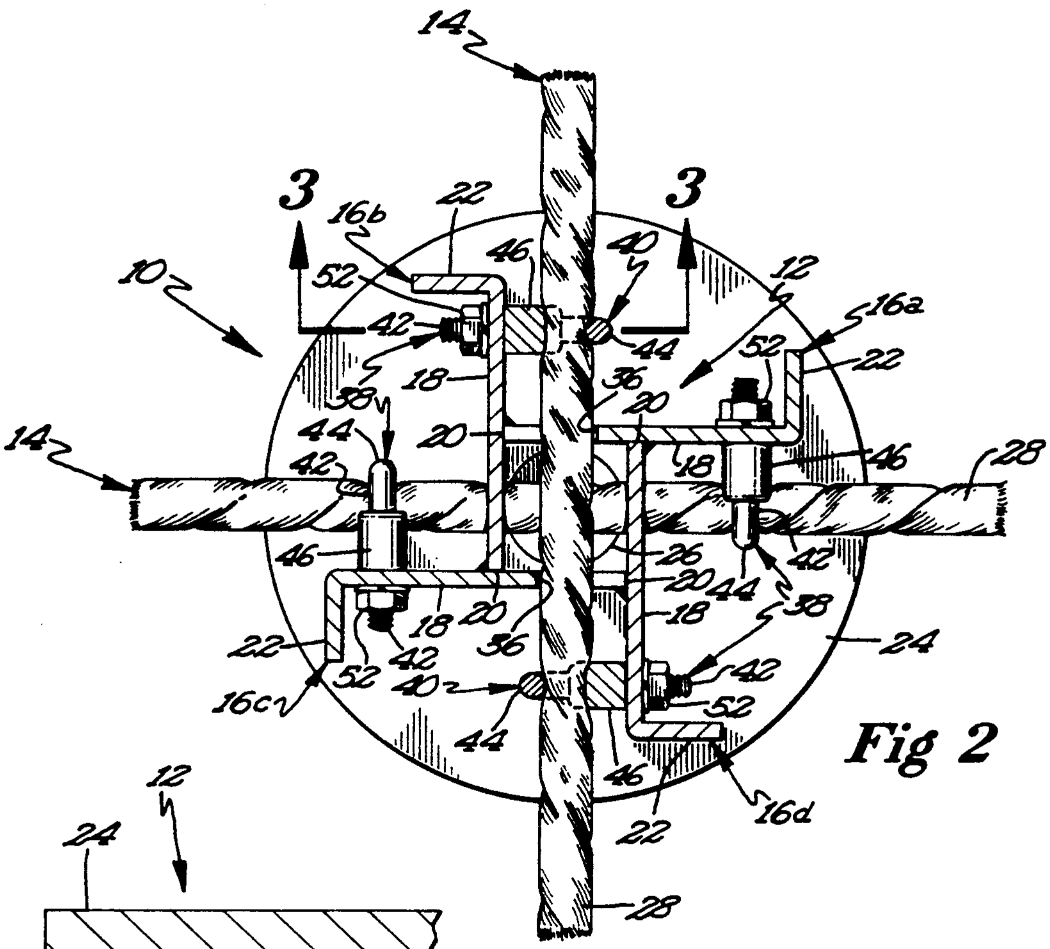
FIG. 2 shows a cross sectional view of the device of FIG. 1 according to section line 2—2 of FIG. 1.
Figure 3:
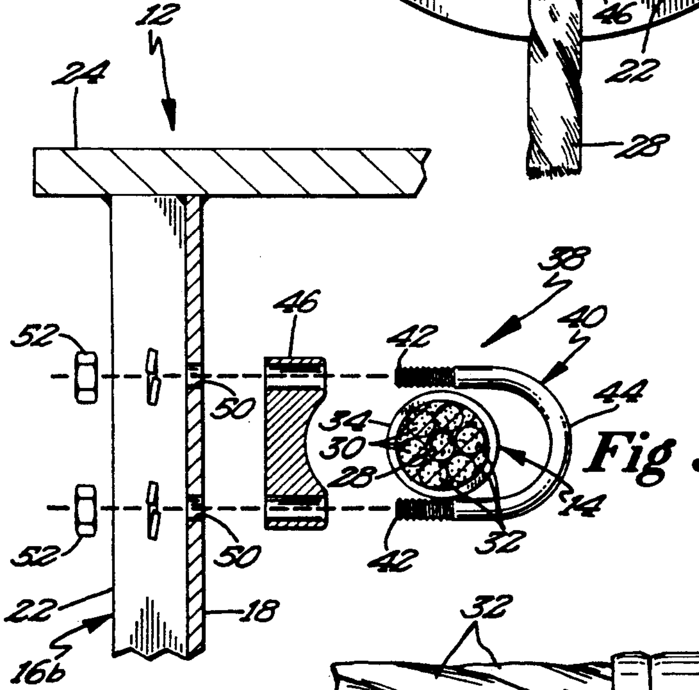
FIG. 3 shows an exploded, cross-sectional view of the device of FIG. 1 according to section line 3—3 of FIG. 2.
Figure 4:
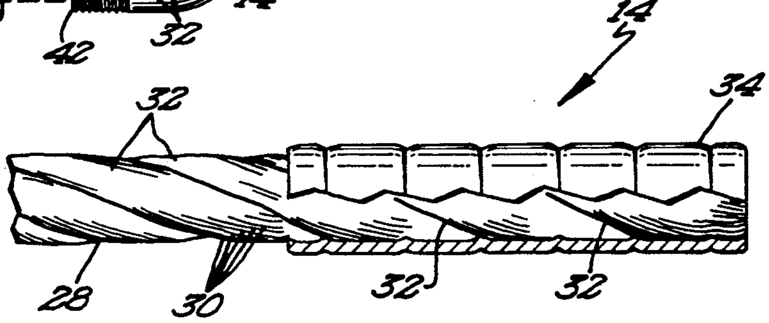
FIG. 4 shows an enlarged side view of the device of FIG. 1 according to view line 4—4 of FIG. 1, with portions broken away to show constructional details.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "bottom", "first", "second", "inside", "horizontal", "below", "axially", and similar terms are used herein, it should be understood that these terms have reference only to the structure shown in the drawings as it would appear to a person viewing the drawings and are utilized only to facilitate describing the invention.

Where used in the disclosure of the present invention, the term "refuse" generally designates solid waste such as but not limited to household waste including yard waste.

DESCRIPTION

Device for tearing bags according to the preferred teachings of the present invention is shown in the drawings and generally designated 10. Device 10 generally includes a rotor 12 having multiple flails 14 rotatable about a horizontal axis extending generally perpendicular to flails 14. Specifically, rotor 12 includes four L-shaped plates 16*a*, 16*b*, 16*c*, and 16*d*. Plates 16 each include a first elongated, flat, planar leg 18 having a first edge 20 and a second edge integrally interconnected to a second, flat, planar leg 22 extending generally perpendicular thereto. Edge 20 of leg 18 of plate 16*a* is attached generally perpendicular to leg 18 of plate 16*b* at a distance spaced from edge 20 of plate 16*b* at least equal to and preferably slightly larger than the cross sectional diameter of flails 14, with leg 22 of plate 16*a* extending parallel to leg 18 of plate 16*b* in a direction opposite to edge 20 of plate 16*b*. Edge 20 of leg 18 of plate 16*b* is attached generally perpendicular to leg 18 of plate 16*c* at a distance spaced from edge 20 of plate 16*c* at least equal to and preferably slightly larger than the cross sectional diameter of flails 14, with leg 22 of plate 16*b* extending parallel to leg 18 of plate 16*c* in a direction opposite to edge 20 of plate 16*c*. Edge 20 of leg 18 of plate 16*c* is attached generally perpendicular to leg 18 of plate 16*d* at a distance spaced from edge 20 of plate 16*d* at least equal to and preferably slightly larger than the cross sectional diameter of flails 14, with leg 22 of plate 16*c* extending parallel to leg 18 of plate 16*d* in a direction opposite to edge 20 of plate 16*d*. Edge 20 of leg 18 of plate 16*d* is attached generally perpendicular to leg 18 of plate 16*a* at a distance spaced from edge 20 of plate 16*a* at least equal to and preferably slightly larger than the cross sectional diameter of flails 14, with leg 22 of plate 16*d* extending parallel to leg 18 of plate 16*a* in a direction opposite to edge 20 of plate 16*a*. Legs 18 of plates 16*a* and 16*c* and of plates 16*b* and 16*d* and edges 20 of plates 16*a* and 16*c* and of plates 16*b* and 16*d* are parallel to and spaced from each other and are located on opposite sides of the axis defined by stub shafts 26. In the preferred form, the spacing of the leg portions between the attachment of edge 20 of leg 18 to leg 18 of the next plate 16 for all of plates 16*a*, 16*b*, 16*c* and 16*d* are equal to form a square tubular beam. Rotor 12 further includes first and second circular, flat, planar end pieces 24 secured to the end edges of plates 16*a*, 16*b*, 16*c*, and 16*d* perpendicular to legs 18 and 22 thereof. Stub shafts 26 extend generally perpendicular to end pieces 24 from its center and generally in line with the square tubular beam formed by plates 16*a*, 16*b*, 16*c*, and 16*d*. Shafts 26 define the horizontal axis of rotor 12.

Flails 14 are flexible and in the most preferred form are formed from metallic and preferably steel wire rope cable 28 of a circular cross section having a diameter in the order of 1 inch (2.54 centimeters). Particularly, cable 28 is formed of multiple steel wires 30 braided into ropes 32, with a plurality of ropes 32 braided into cable 28. Cable 28 has a length which is a multiple of the diameter of rotor 12 and of the radial length of legs 18. The ends of each cable 28 includes a thick wall tubing 34 which is secured thereto such as by swedging, with tubing 34 having a cylindrical shape in the preferred form. In the most preferred form, the outer diameter of tubing 34 is generally equal to but slightly smaller than the spacing in rotor 12 of the attachment of edge 20 of leg 18 to leg 18 of the next plate 16.

For purposes of securing flails 14 to rotor 12, U-shaped apertures 36 extend from edge 20 of plates 16 and are of a size and shape for slideable receipt of flails 14 and in the preferred form have a radial extent generally equal to the spacing in rotor 12 of the attachment of edge 20 of leg 18 to leg 18 of the next plate 16. Cable clamps 38 are further provided and in the most preferred form include a U-shaped bolt 40 having first and second legs 42 extending in a spaced parallel relation from a semicircular central portion 44. Legs 42 are spaced a distance allowing slideable receipt of bolt 40 upon cables 28 of flails 14. Cable clamps 38 further include a U-shaped jaw member 46 slideably received on and between legs 42 for movement relative to central portion 44 for sandwiching cable 28 intermediate jaw member 46 and central portion 44. Plates 46 further include pairs of apertures 50 formed in legs 18 intermediate leg 22 and the attachment of edge 20 of the next plate 16 and of a size, shape, and location corresponding to and for slideable receipt of legs 42 of bolt 40. Nuts 52 are threadably received on legs 44 on the side of leg 18 opposite to jaw member 46 and central portion 44. Thus, by threading nuts 52 on legs 42, central portion 44 of bolt 40 is drawn towards leg 18 and sandwiches cable 28 against jaw member 46.

In the preferred form, five flails 14 are provided. In the most preferred form, three flails 14 extend parallel to and intermediate legs 18 of plates 16*a* and 16*c* and generally equally axially spaced along rotor 12 and extend generally perpendicular to the axis defined by stub shafts 26. Particularly, the three flails 14 extend through U-shaped apertures 36 formed in plates 16*b* and 16*d* and are secured to rotor 12 by cable clamps 38 having legs 42 extending through apertures 50 formed in plates 16*a* and 16*c*. The other two flails 14 extend parallel to and intermediate legs 18 of plates 16*b* and 16*d*, axially spaced along rotor 12 generally equal to the axial spacing of the other three flails 14 and located intermediate the other three flails 14 and extend generally perpendicular to the axis defined by stub shafts 26. Particularly, the other two flails 14 extend through U-shaped apertures 36 formed in plates 16*a* and 16*c* and are secured to rotor 12 by cable clamps 38 having legs 42 extending through apertures 50 formed in plates 16*b* and 16*d*.

Now that the basic construction of device 10 according to the preferred teachings of the present invention has been set forth, the operation of device 10 can be explained and appreciated. Specifically, rotor 12 and flails 14 secured thereto are rotatably mounted inside of a housing 54 and rotated by any suitable means such as a motor 56 having an output shaft connected to one of the stub shafts 26. An input conveyer 58 extends into housing 54 for delivering the bags to flails 14, with the end of conveyer 58 being spaced from the axis of rotor 12 defined by stub shafts 26 a horizontal distance slightly greater than the radial length of flails 14 and spaced vertically below the axis of rotor 12 defined by stub shafts 26 a distance slightly less than the radial length of flails 14. Thus, as bags of refuse transported by conveyer 58 fall from the end of conveyer 58 under gravitational forces, such bags are struck or batted in the same direction by flails 14 rotating vertically downward in vertical planes of rotation as rotor 12 is rotated and tears the bags, releasing the refuse contained therein. It should be noted that device 10 according to the preferred teachings of the present invention does not grind the refuse like a hammer mill but rather tears the bags and empties the bags of refuse for further processing. Particularly, the refuse is falling under gravitational forces and particularly is not supported in planes perpendicular to the axis of rotor 12 defined by stub shafts 26 and in planes parallel to the planes of rotation of flails 14, and in the most preferred form falling from conveyer 58, is not supported in any manner. Further, the refuse is not captured or sandwiched between flails 14 and housing 54 or is not forced to pass through or against a restricted passage such as a sieve, which can act as an anvil against which cutting or grinding forces are applied. Rather, flails 14 strike the bags of refuse, much like a bat hitting a ball. The force of flails 14 hitting the bags over a relatively small area of the bag causes the bag to split or tear, with flails 14 hitting the bags in the same direction as they are falling also providing some momentum force to the bag falling under gravitational forces. It can then be appreciated that due to the relatively unrestricted passage of refuse through device 10 according to the preferred teachings of the present invention (aside from being struck by flails 14) in planes perpendicular to the axis defined by stub shafts 26 and parallel to the vertical planes of rotation of flails 14, device 10 is able to continuously tear bags at a relatively high rate, and particularly at a capacity greater than would be possible if a cutting or grinding action were utilized. Further, due to the relatively small radial cross sectional area of flails 14, flails 14 do not create a large amount of windage. Thus, the refuse does not tend to circle in housing 54 with rotor 12 and flails 14 but rather tends to fall below rotor 12 and flails 14, with circling of refuse requiring multiple actions reducing device capacity. Housing 54 includes a bottom opening allowing the refuse and torn bags to fall therethrough generally under gravitational forces such as onto a further conveyer for delivery for further processing such as by a grinding mill of the type shown and described in U.S. Pat. No. 4,989,796. It can be appreciated that after exiting device 10 according to the teachings of the present invention, the refuse can be further processed as desired such as removing ferrous or similar material for recycling, removing the torn bags from the refuse where the refuse is desired to be composted, with the bags tending to remain in one or large pieces for easy separation after being torn with device 10 of the preferred form of the present invention, or like processing.

It can then be appreciated that tubing 34 swedged on the ends of cables 28 of flails 14 is advantageous according to the preferred teachings of the present invention. Particularly, tubing 34 prevents ropes 32 and wires 30 from unraveling and thus prevents cable 28 from fraying from repeatedly hitting refuse. Further, tubing 34 acts as centrifugal weights for bringing flails 14 to extend radially from rotor 12 when rotor 12 is rotated even when flails 14 engage refuse falling from the end of conveyer 58. Also, tubing 34 acts as hammers for striking the refuse and tearing the bags.

Further, flails 14 formed from cable 28 are advantageous according to the preferred teachings of the present invention. Particularly, cables 28 have sufficient flexibility to allow deflection around large hard objects such as automobile leaf springs and wheel rims, bicycles, and the like included within the refuse to avoid breakage and/or damage to flails 14 themselves but have sufficient rigidity to allow flails to strike and tear the bags covering the refuse. Further, flails 14 do not use knife or cutting edges which wear or are prone to damage and thus require sharpening and/or frequent replacement but rather use the striking force to tear the bags. Also, flails 14 are formed from stock, readily available material and avoid capital expenditures for tooling and the like. Further, being formed from metal, wires 30 and ropes 32 of cables 28 are not prone to wear or breakage even after long operation.

Likewise, rotor 12 and the preferred method of securing flails 14 thereto are advantageous according to the preferred teachings of the present invention. Particularly, with the rotor axis formed from stub shafts 26 extending from the square tubular beam of rotor 12, cables 28 of flails 14 are diametric and able to extend continuously through the rotor axis. Thus, flails 14 have increased strength and are easier to manufacture and secure than if the flails were formed from two, radial pieces. Additionally, due to the rigidity and unbending nature of cables 28 and specifically with cables 28 being unable to be bent in an arcuate manner with a relatively small diameter such as to wrap upon a shaft or other small diameter, it would be generally impossible for cables 28 to be arched over or wrapped around an axle shaft. Further, due to the large mass of cables 28, if the cables were arched over, wrapped around, or extended tangentially to an axle shaft, the rotor could be dynamically unbalanced and can result in excessive vibration.

Similarly, the use of cable clamps 38 allows cables 28 to be tightly secured to rotor 12 to prevent slipping or sliding of flails 14 even though rotor 12 and flails 14 are rotating and even though flails 14 are continuously engaging refuse at considerable force. Legs 22 of plates 16 extend generally parallel to the free ends of legs 42 and nuts 52 and act as a shield to protect the free ends of legs 42 and nuts 52 from wear as the result of engaging the refuse and to keep refuse from wrapping around the free ends of legs 42 and nuts 52. Likewise, the L-shaped nature and radial size of plates 16 tend to force any refuse outwardly as rotor 12 is rotated and help protect against refuse wrapping around rotor 12 as often occurs around cylindrical shafts or similar.

Furthermore, as previously set forth for flails 14, rotor 12 of the most preferred form of the present invention is formed of readily available stock material which can be easily fabricated by welding. Thus, the capital expenditures of tooling and the like are avoided according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device for tearing bags containing material such as refuse comprising, in combination: a plurality of elongated flails; means for rotating the flails in planes and about an axis generally perpendicular to the flails; and means for delivering the bags to the flails with the bags being unsupported and having generally unrestricted passage in planes perpendicular to the axis and parallel to the planes of rotation of the flails when the flails strike the bags.

2. The bag tearing device of claim 1 wherein the axis is horizontal; and wherein the delivering means comprises means for delivering bags to fall under gravitational forces, with the bags being struck by the flails in vertical planes of rotation as the bags fall under gravitational forces.

3. The bag tearing device of claim 2 wherein the flails are flexible to allow deflection when the bags are struck.

4. The bag tearing device of claim 3 wherein the flails comprise metallic wire rope cable.

5. The bag tearing device of claim 4 wherein the flails further comprise, in combination: means for preventing the free ends of the cable from fraying.

6. The bag tearing device of claim 4 further comprising, in combination: a rotor for rotation about the axis, with the rotor comprising at least a first plate including first and second edges located on opposite sides of the axis and first and second end edges; first and second means secured to the first and second end edges of the first plate for rotatably mounting the first plate about the rotor axis and spaced from the rotor axis, with the flails being diametric and extending across the first plate and beyond the first and second edges of the first plate; and means for clamping the flails to the first plate and extending continuously through the rotor axis.

7. The bag tearing device of claim 5 further comprising, in combination: a rotor for rotation about the axis, with the rotor comprising at least a first, generally L-shaped plate including a first leg interconnected to a second leg; and means for clamping the flails to the first leg, with the second leg protecting the clamping means.

8. The bag tearing device of claim 5 further comprising, in combination: a rotor for rotation about the axis, with the rotor comprising a first plate and a second plate, with the second plate being parallel to and spaced from the first plate, with the first and second plates located on opposite sides of the axis, with the flails extending between the first and second plates; means for clamping the flails to the first plate; and means for clamping the flails to the second plate on the opposite side of the axis than the clamping means of the first plate.

9. The bag tearing device of claim 8 wherein the rotor further comprises, in combination: first and second leg portions, with the first and second plates having inner edges, with the first leg portion extending between the inner edge of the first plate and the second plate spaced from the inner edge of the second plate, with the second leg portion extending between the inner edge of the second plate and the first plate spaced from the inner edge of the first plate, with the first and second leg portions including apertures for slideable receipt of the flails.

10. The bag tearing device of claim 9 wherein the rotor further comprises, in combination: third and fourth plates, with the third plate including the first leg portion and the fourth plate including the second leg portion; means for clamping the flails to the third plate; and means for clamping the flails to the fourth plate.

11. The bag tearing device of claim 1 further comprising, in combination: a rotor for rotation about the axis, with the rotor comprising at least a first plate including first and second edges located on opposite sides of the axis and first and second end edges; first and second means secured to the first and second end edges of the first plate for rotatably mounting the first plate about the rotor axis and said first plate spaced from the rotor axis, with the flails being diametric and extending across the first plate and beyond the first and second edges of the first plate; and means for clamping the flails to the first plate and extending continuously through the rotor axis.

12. The bag tearing device of claim 1 further comprising, in combination: a rotor for rotation about the axis, with the rotor comprising at least a first, generally L-shaped plate including a first leg interconnected to a second leg; and means for clamping the flails to the first leg, with the second leg protecting the clamping means.

13. The bag tearing device of claim 1 further comprising, in combination: a rotor for rotation about the axis, with the rotor comprising a first plate and a second plate, with the second plate being parallel to and spaced from the first plate, with the first and second plates located on opposite sides of the axis, with the flails extending between the first and second plates; means for clamping the flails to the first plate; and means for clamping the flails to the second plate on the opposite side of the axis than the clamping means of the first plate.

14. The bag tearing device of claim 13 wherein the rotor further comprises, in combination: first and second leg portions, with the first and second plates having inner edges, with the first leg portion extending between the inner edge of the first plate and the second plate spaced from the inner edge of the second plate, with the second leg portion extending between the inner edge of the second plate and the first plate spaced from the inner edge of the first plate, with the first and second leg portions including apertures for slideable receipt of the flails.

15. The bag tearing device of claim 14 wherein the rotor further comprises, in combination: third and fourth plates, with the third plate including the first leg portion and the fourth plate including the second leg portion; means for clamping the flails to the third plate; and means for clamping the flails to the fourth plate.

16. Rotor for rotation about a rotor axis comprising, in combination: at least a first, generally L-shaped plate including a first leg interconnected to a second leg; a plurality of elongated, flexible flails extending generally perpendicular to the rotor axis; and means for clamping the flails to the first leg, with the second leg protecting the clamping means.

17. Rotor for rotation about a rotor axis comprising, in combination: at least a first plate including first and second edges located on opposite sides of the axis and first and second end edges; first and second means secured to the first and second end edges of the first plate for rotatably mounting the first plate about the rotor axis and spaced from the rotor axis; a plurality of elongated, flexible flails, with the flails being diametric, with the flails extending across the first plate and beyond the first and second edges of the first plate generally perpendicular to and continuously through the rotor axis.

18. Rotor for rotation about a rotor axis comprising, in combination: at least a first plate; a second plate, with the second plate being parallel to and spaced from the first plate, with the first and second plates located on opposite sides of the rotor axis; a plurality of elongated, flexible flails extending generally perpendicular to the rotor axis, with the flails extending between the first and second plates; means for clamping the flails to the first plate; and means for clamping the flails to the second plate on the opposite side of the axis than the clamping means of the first plate.

19. The rotor of claim 18 further comprising, in combination: first and second leg portions, with the first and second plates having inner edges, with the first leg portion extending between the inner edge of the first plate and the second plate spaced from the inner edge of the second plate, with the second leg portion extending between the inner edge of the second plate and the first plate spaced from the inner edge of the first plate, with the first and second leg portions including apertures for slideable receipt of the flails.

20. The rotor of claim 19 further comprising, in combination: third and fourth plates, with the third plate including the first leg portion and the fourth plate including the second leg portion; means for clamping the flails to the third plate; and means for clamping the flails to the fourth plate.

* * * * *